(12) United States Patent
Harmon et al.

(10) Patent No.: US 12,272,134 B2
(45) Date of Patent: Apr. 8, 2025

(54) SYSTEM AND METHOD FOR IDENTIFYING WEEDS WITHIN A FIELD DURING AN AGRICULTURAL SPRAYING OPERATION

(71) Applicant: CNH Industrial America LLC, New Holland, PA (US)

(72) Inventors: Andrew W. Harmon, Sheboygan, WI (US); Kevin M. Smith, Narvon, PA (US); Trevor Stanhope, Oak Lawn, IL (US)

(73) Assignee: CNH Industrial America LLC, New Holland, PA (US)

( * ) Notice: Subject to any disclaimer, the term of this patent is extended or adjusted under 35 U.S.C. 154(b) by 873 days.

(21) Appl. No.: 17/349,296

(22) Filed: Jun. 16, 2021

(65) Prior Publication Data
US 2022/0405505 A1  Dec. 22, 2022

(51) Int. Cl.
| | | |
|---|---|---|
| *G06K 9/00* | (2022.01) | |
| *A01C 23/00* | (2006.01) | |
| *A01M 7/00* | (2006.01) | |
| *B05B 12/12* | (2006.01) | |
| *G05B 19/042* | (2006.01) | |
| *G06F 18/24* | (2023.01) | |
| *G06T 7/60* | (2017.01) | |
| *G06T 7/70* | (2017.01) | |

(Continued)

(52) U.S. Cl.
CPC ............ *G06V 20/00* (2022.01); *A01C 23/007* (2013.01); *A01M 7/0089* (2013.01); *B05B 12/122* (2013.01); *G05B 19/042* (2013.01); *G06F 18/24* (2023.01); *G06T 7/60* (2013.01); *G06T 7/70* (2017.01); *G06T 7/90* (2017.01); *G05B 2219/25252* (2013.01); *G05B 2219/25257* (2013.01); *G05B 2219/25266* (2013.01); *G06T 2207/30188* (2013.01); *G06V 20/68* (2022.01)

(58) Field of Classification Search
None
See application file for complete search history.

(56) References Cited

U.S. PATENT DOCUMENTS

| | | |
|---|---|---|
| 8,027,770 B2 | 9/2011 | Poulsen |
| 9,119,388 B2 | 9/2015 | Jens |

(Continued)

FOREIGN PATENT DOCUMENTS

| | | |
|---|---|---|
| EP | 3165089 A1 | 5/2017 |
| EP | 3482632 A1 | 5/2019 |
| EP | 3192342 A1 | 10/2019 |

*Primary Examiner* — Tuan S Nguyen
(74) *Attorney, Agent, or Firm* — Rebecca Henkel; Peter K. Zacharias; Rickard DeMille (57) ABSTRACT

A system for identifying weeds present within a field includes an imaging device configured to capture an image depicting a plurality of plants present within the field. Furthermore, the system includes a computing system communicatively coupled to the imaging device, with the computing system configured to receive the image captured by the imaging device. Additionally, the computing system is configured to identify a stalk of each of the plurality of plants depicted within the received image. Moreover, the computing system is configured to determine a parameter associated with each identified stalk. In addition, the computing system is configured to identify each plant of the plurality of plants as a crop or a weed based on the corresponding determined parameter.

10 Claims, 6 Drawing Sheets

(51) Int. Cl.
    *G06T 7/90*     (2017.01)
    *G06V 20/00*     (2022.01)
    *G06V 20/68*     (2022.01)

(56) References Cited

U.S. PATENT DOCUMENTS

| | | |
|---|---|---|
| 9,609,859 B2 | 4/2017 | Stowe et al. |
| 10,051,854 B2 | 8/2018 | Stowe et al. |
| 10,390,497 B2 | 8/2019 | Redden |
| 10,568,316 B2 | 2/2020 | Gall et al. |
| 10,701,926 B2 | 7/2020 | Struve |
| 2015/0015697 A1* | 1/2015 | Redden .................. G01B 11/24 382/110 |
| 2017/0206415 A1* | 7/2017 | Redden ................ H04N 13/271 |
| 2018/0308229 A1* | 10/2018 | Winkler ................. G06V 20/56 |
| 2018/0330165 A1* | 11/2018 | Halligan ............... G06V 20/188 |
| 2019/0021226 A1* | 1/2019 | Dima .................... A01D 34/008 |
| 2020/0215865 A1 | 7/2020 | Sirault et al. |

\* cited by examiner

SYSTEM AND METHOD FOR IDENTIFYING WEEDS WITHIN A FIELD DURING AN AGRICULTURAL SPRAYING OPERATION

FIELD OF THE INVENTION

The present disclosure generally relates to agricultural sprayer and, more particularly, to systems and methods for identifying weeds within a field during an agricultural spraying operation.

BACKGROUND OF THE INVENTION

Agricultural sprayers apply an agricultural fluid (e.g., a pesticide, a nutrient, and/or the like) onto crops as the sprayer is traveling across a field. To facilitate such travel, sprayers are configured as self-propelled vehicles or implements towed behind an agricultural tractor or other suitable work vehicle. A typical sprayer includes a boom assembly on which a plurality of spaced apart nozzles is mounted. Each nozzle is configured to dispense or otherwise spray a fan of the agricultural fluid onto the underlying plants.

Traditionally, during agricultural spraying operations, agricultural fluid is applied to the field without regard to whether the plants being sprayed are weeds or crops. For example, when applying a herbicide to a field to reduce weed coverage using traditional spraying methods, the herbicide is dispensed across the entire field, including the portions of the field where weeds are not present. Such traditional spraying methods dispense a much larger volume of agricultural fluid across the field than is necessary. In this respect, systems for selectively spraying only the weeds or only the crops have been developed. While such systems work well, further improvements are needed. For example, current selective spraying systems have difficulty identifying weeds present within a crop row (e.g., between crops within the same crop row).

Accordingly, an improved system and method for identifying weeds present within a field would be welcomed in the technology. In particular, a system and method for identifying weeds present within the crops rows of a field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for identifying weeds present within a field. The system includes an imaging device configured to capture an image depicting a plurality of plants present within the field. Furthermore, the system includes a computing system communicatively coupled to the imaging device, with the computing system configured to receive the captured image captured from the imaging device. Additionally, the computing system is configured to identify a stalk of each plant of the plurality of the plants depicted within the received image. Moreover, the computing system is configured to determine a parameter associated with each identified stalk. In addition, the computing system is configured to identify each plant of the plurality of plants as a crop or a weed based on the corresponding determined parameter.

In another aspect, the present subject matter is directed to a method for identifying weeds present within a field. The method includes receiving, with a computing system, an image depicting a plurality of plants present within a portion of the field from an imaging device. Furthermore, the method includes identifying, with the computing system, a stalk of each plant of the plurality of the plants depicted within the received image. Additionally, the method includes determining, with the computing system, a parameter associated with each identified stalk. Moreover, the method includes identifying, with the computing system, each plant of the plurality of plants as a crop or a weed based on the corresponding determined parameter. In addition, the method includes controlling, with the computing system, an operation of a nozzle of an agricultural sprayer to selectively dispense agricultural fluid based on the identification of each plant as one of a crop or a weed.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for identifying weeds present within a field. Specifically, the disclosed system may include one or more imaging devices (e.g., a camera(s)) configured to capture images of the field as an agricultural sprayer travels across the field to perform a spraying operation thereon. The captured images may, in turn, depict plants present within the field, such as a crop row(s). Thereafter, the captured images may be transmitted to a computing system of the disclosed system for processing/analysis.

In several embodiments, the computing system may be configured to analyze the received images to identify each plant depicted therein as either a crop or a weed. More specifically, the computing system may identify the stalk of each plant depicted within a given image received from the imaging device. For example, in one embodiment, the computing system may identify the stalks based on the ratios of the length to the width of the groups of pixels within the given image classified as plant pixels. Alternatively, in another embodiment, the computing system may identify the top end and the bottom end of each plant depicted within the given image. In such an embodiment, the computing system may then form a line connecting the top and bottom ends of each plant, with the formed lines corresponding to the stalks of the plants. Furthermore, the computing system may determine one or more parameters (e.g., length, orientation, etc.) associated with the identified stalks. Thereafter, the computing system may identify each plant depicted within the given image as either a crop or a weed based on the corresponding determined parameter(s).

Unlike conventional systems/methods, the system and method disclosed herein can accurately identify weeds present within a crop row (e.g., between the individual crop plants present within the same crop row). For example, many conventional systems rely on the known locations of the crop rows within the field to identify weeds. Specifically, such systems identify all plants at the location of a crop row as crops and all plants at a location other than that of a crop row (i.e., between the crop rows) as weeds. However, weeds can grow within the crop rows and, in many instances, in close proximity to the individual crop plants. Thus, conventional systems may incorrectly identify weeds in these positions as crops. In general, the stalks of the crops and stalks of the weeds generally have dimensional parameters (e.g., different lengths, orientations, relative spacing, etc.). Thus, by identifying stalks of the plants depicted within captured images of a field and subsequently using parameters associated with such stalks to identify each plant as either a weed or a crop allows the disclosed system and method to accurately identify weeds present within a crop row.

Figure 1:
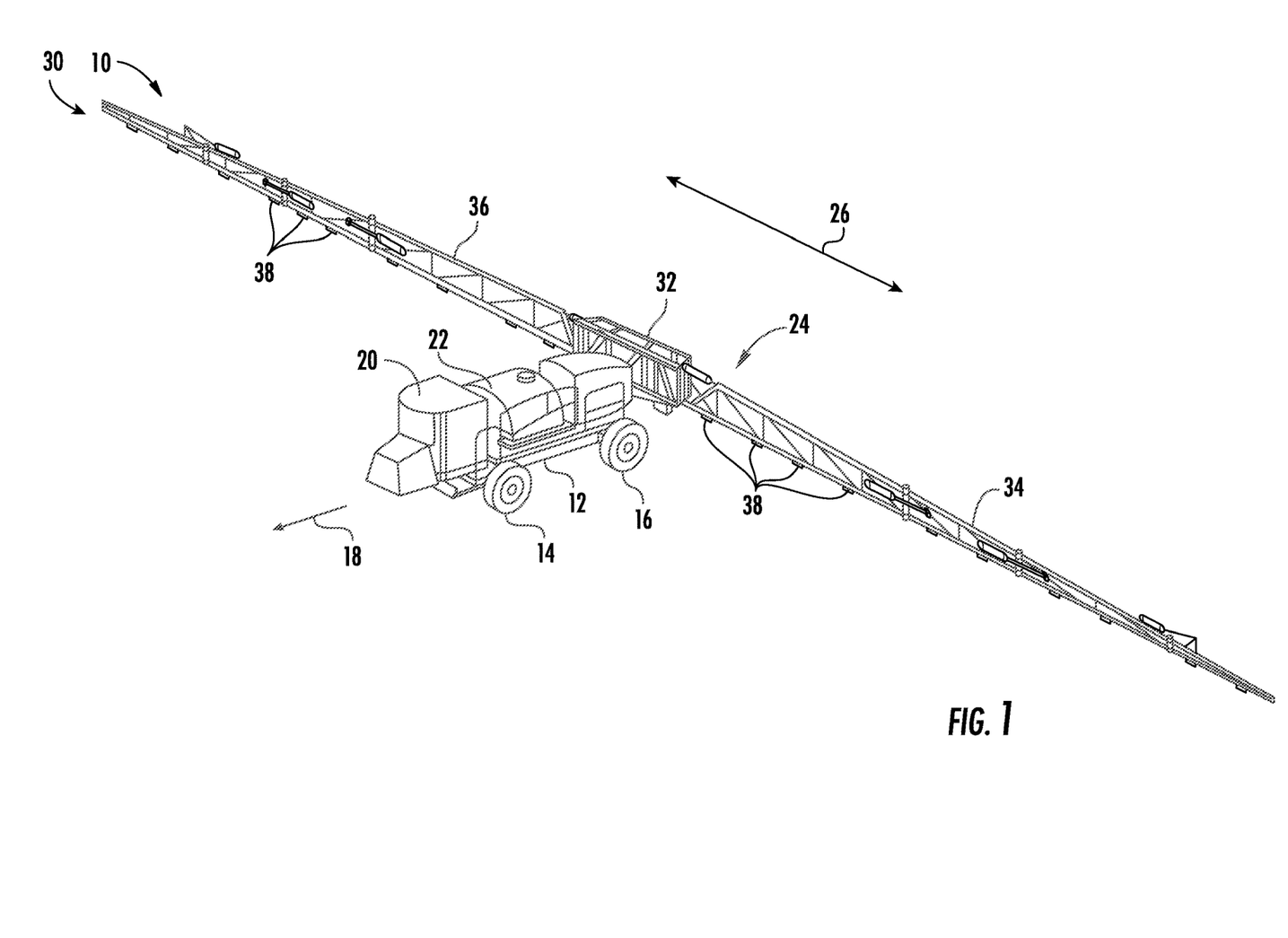
FIG. 1 illustrates a perspective view of one embodiment of an agricultural sprayer in accordance with aspects of the present subject matter.

Referring now to the drawings, FIG. 1 illustrates a perspective view of one embodiment of an agricultural sprayer 10. In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like).

As shown in FIG. 1, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in a direction of travel (indicated by arrow 18) across the field. Furthermore, the frame 12 may support a cab 20 and an agricultural fluid tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may have any other suitable configuration. For example, in one embodiment, the front wheels 14 of the sprayer 10 may be driven in addition to or in lieu of the rear wheels 16.

Additionally, the sprayer 10 may include a boom assembly 24 mounted on the frame 12. In general, the boom assembly 24 may extend in a lateral direction (indicated by arrow 26) between a first lateral end 28 and a second lateral end 30, with the lateral direction 26 extending perpendicular to the direction of travel 18. In one embodiment, the boom assembly 24 may include a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30.

Furthermore, a plurality of nozzles 38 may be supported on the boom assembly 24. Each nozzle 38 may, in turn, be configured to dispense the agricultural fluid stored in the tank 22 onto the underlying plants present within the field. Specifically, as will be described below, the nozzles 38 may be controlled to selectively spray the agricultural fluid on either only the plants identified as weeds or only the plants identified as crops, thereby reducing the amount of agricultural fluid necessary to perform the spraying operation. However, in alternative embodiments, the boom assembly 24 may have any other suitable configuration.

It should be further appreciated that the configuration of the agricultural sprayer 10 described above and shown in FIG. 1 is provided only to place the present subject matter in an exemplary field of use. Thus, it should be appreciated that the present subject matter may be readily adaptable to any manner of agricultural sprayer configuration.

Figure 2:
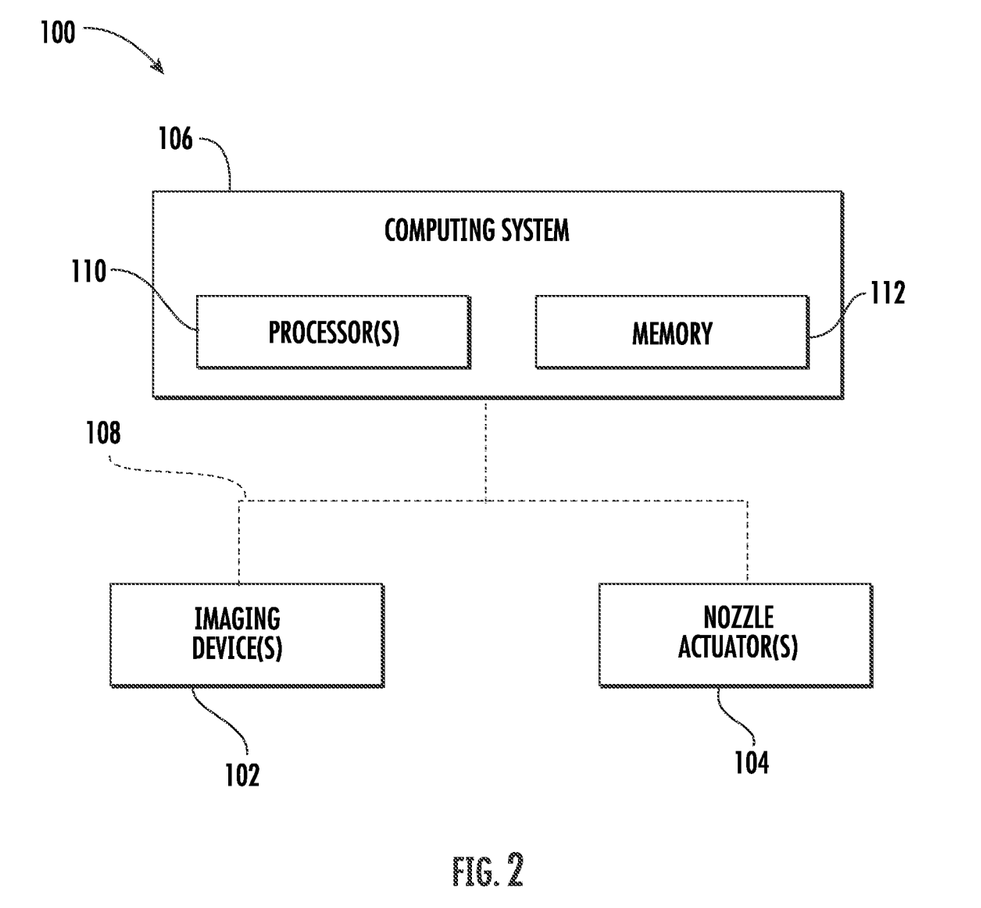
FIG. 2 illustrates a schematic view of one embodiment of a system for identifying weeds present within a field in accordance with aspects of the present subject matter.

Referring now to FIG. 2, a schematic view of one embodiment of a system 100 for identifying weeds present within a field is illustrated in accordance with aspects of the present subject matter. In general, the system 100 will be described herein with reference to the agricultural sprayer 10 described above with reference to FIG. 1. However, it should be appreciated by those of ordinary skill in the art that the disclosed system 100 may generally be utilized with agricultural sprayers having any other suitable sprayer configuration.

As shown in FIG. 2, the system 100 may include one or more imaging devices 102 mounted on otherwise supported on the agricultural sprayer 10. In general, the imaging devices(s) 102 may be configured to capture images depicting plants present within the field as the agricultural sprayer 10 travels across the field to perform a spraying operation thereon. As will be described below, a computing system may be configured to analyze the captured images to identify each plant depicted therein as either a weed or a crop. Thereafter, the nozzles 38 of the sprayer 10 may be controlled to selectively spray the agricultural fluid on either only the plants identified as weeds or only the plants identified as crops.

In general, the imaging device(s) 102 may correspond to any suitable device(s) configured to capture images or other image data depicting the plants growing within the portion of the field. For example, in one embodiment, the imaging device(s) 102 may correspond to a stereographic camera(s) configured to capture three-dimensional images of the plants present within its field of view. In other embodiments, the imaging device(s) 102 may correspond to a monocular camera(s) configured to capture two-dimensional images of the plants present within its field of view. However, in alternative embodiments, the imaging device(s) 102 may correspond to any other suitable sensing device(s) configured to capture images or image-like data, such as a LIDAR sensor(s) or a RADAR sensor(s).

The imaging device(s) 102 may be installed at any suitable location(s) that allow the imaging device(s) 102 to capture images depicting the plants present within the field. For example, in some embodiments, the imaging device(s) 102 may be mounted on wing booms 34, 36 of the boom assembly 24 (FIG. 1). However, in alternative embodiments, the imaging device(s) 102 may be installed at any other suitable location(s), such as on the roof of the cab 20 (FIG. 1) or the center boom section 32. Additionally, any suitable number of imaging device(s) 102 may be installed on the sprayer 10.

Furthermore, the system 100 may include one or more nozzle actuators 104, with each nozzle actuator 104 corresponding to one of the nozzles 38 of the sprayer 10. In general, each nozzle actuator 104 may be configured to control when and how much agricultural fluid is dispensed by the corresponding nozzle 38. For example, in several embodiments, each nozzle actuator 104 may be configured to open and close a valve member (not shown) positioned within the corresponding nozzle 38, thereby controlling when and how much agricultural fluid is dispensed by the nozzle 38. As such, in some embodiments, the nozzle actuator(s) 104 may be configured as a solenoid(s). However, in alternative embodiments, the nozzle actuator(s) 104 may be configured as any other suitable device(s) configured to control when and how much agricultural fluid is dispensed by the corresponding nozzle 38, such as a stepper motor(s).

Additionally, the system 100 may include a computing system 106 communicatively coupled to one or more components of the sprayer 10 and/or the system 100 to allow the operation of such components to be electronically or automatically controlled by the computing system 106. For instance, the computing system 106 may be communicatively coupled to the imaging device(s) 102 via a communicative link 108. As such, the computing system 106 may be configured to receive images depicting plants present within the field across which the sprayer 10 is traveling from the imaging device(s) 102. Moreover, the computing system 106 may be communicatively coupled to the nozzle actuator(s) 104 via the communicative link 108. As such, the computing system 106 may be configured to control the operation of the nozzle actuator(s) 104 to control when and how much agricultural fluid is dispensed by the nozzle(s) 38. In addition, the computing system 106 may be communicatively coupled to any other suitable components of the sprayer 10 and/or the system 100.

In general, the computing system 106 may comprise one or more processor-based devices, such as a given controller or computing device or any suitable combination of controllers or computing devices. Thus, in several embodiments, the computing system 106 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 112 of the computing system 106 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 112 may generally be configured to store suitable computer-readable instructions that, when implemented by the processor(s) 110, configure the computing system 106 to perform various computer-implemented functions, such as one or more aspects of the methods and algorithms that will be described herein. In addition, the computing system 106 may also include various other suitable components, such as a communications circuit or module, one or more input/output channels, a data/control bus and/or the like.

The various functions of the computing system 106 may be performed by a single processor-based device or may be distributed across any number of processor-based devices, in which instance such devices may be considered to form part of the computing system 106. For instance, the functions of the computing system 106 may be distributed across multiple application-specific controllers or computing devices, such as a navigation controller, an engine controller, a transmission controller, a spray controller, and/or the like.

Figure 4:
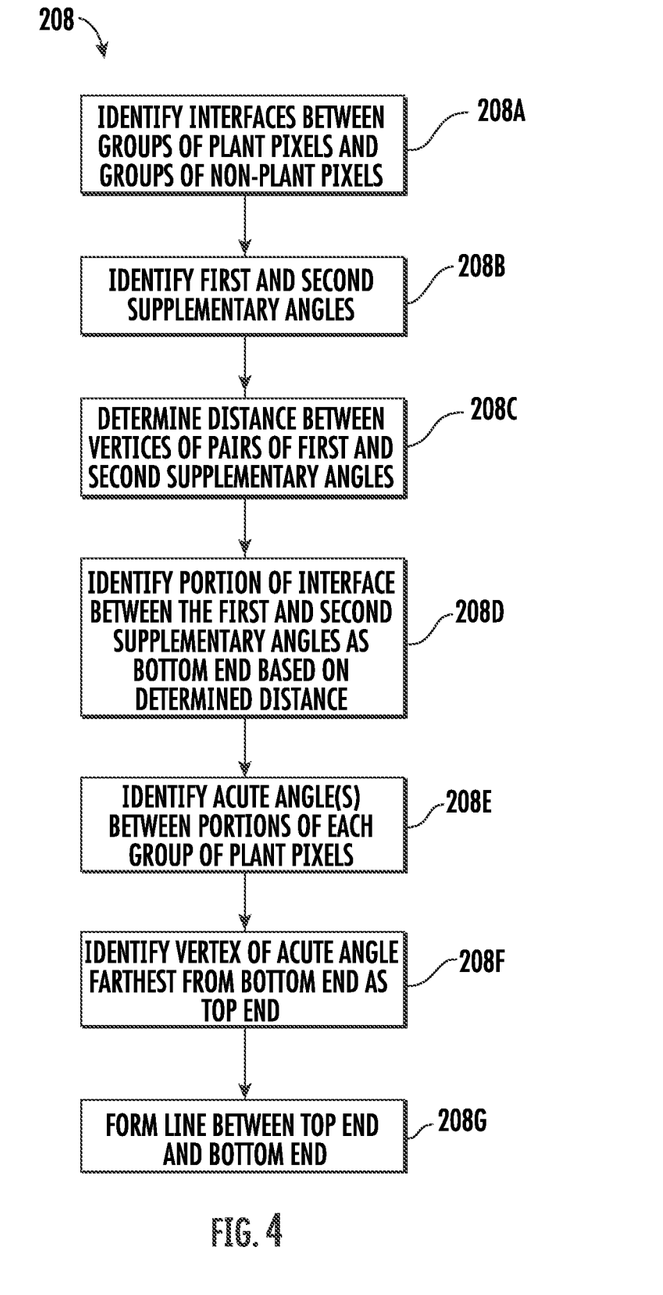
FIG. 4 illustrates a flow diagram providing one embodiment of an example method of identifying stalks of plant that may be incorporated into the example control logic of FIG. 3.

Referring now to FIG. 4, a flow diagram of one embodiment of example control logic 200 that may be executed by the computing system 106 (or any other suitable computing system) for identifying weeds present within a field is illustrated in accordance with aspects of the present subject matter. Specifically, the control logic 200 shown in FIG. 4 is representative of steps of one embodiment of an algorithm that can be executed to identify the plants present within a field as either weeds or crops in a manner that allows the weeds present within a crop row to be accurately identified. Thus, in several embodiments, the control logic 200 may be advantageously utilized in association with a system installed on or forming part of an agricultural sprayer to allow for real-time weed identification without requiring substantial computing resources and/or processing time. However, in other embodiments, the control logic 200 may be used in association with any other suitable system, application, and/or the like for controlling the ground speed of a sprayer.

As shown in FIG. 4, at (202), the control logic 200 includes receiving an input indicative of the intra-row crop spacing of the crops growing within a field across which an agricultural sprayer will travel. For example, before beginning a spraying operation, the operator of the sprayer 10 may input the intra-row spacing of the crops growing within the field into a user interface (not shown). Thereafter, the operator input may be transmitted from the user interface to the computing system 106 (e.g., via the communicative link 108). As will be described below, the intra-row spacing of the crops growing within the field may be used when determining whether the plants present within the field are crops or weeds.

Furthermore, at (204), the control logic 200 includes receiving captured images depicting a plurality of plants present within a portion of the field from an imaging device. Specifically, as mentioned above, in several embodiments, the computing system 120 may be communicatively coupled to the imaging device(s) 102 mounted on the sprayer 10 via the communicative link 108. In this respect, as the sprayer 10 travels across the field to perform the spraying operation, the computing system 120 may receive images depicting the plants present within the field from the imaging device(s) 102. As will be described below, the received images may be processed to identify each plant depicted therein as either a crop or a weed.

For the purposes of clarity, the below steps of the control logic 200 will be described in the context of processing a single captured image. These steps may be repeated on each subsequently received image to identify the plant depicted in each subsequent image as either a crop or a weed.

Moreover, at (206), the control logic 200 includes classifying each pixel of the plurality of pixels forming the received image as either a plant pixel or a non-plant pixel. More specifically, the plants within the field are generally a shade of green (i.e., both the crops and the weeds). Conversely the soil, rocks, and other non-plant matter within the field are generally not green (e.g., a shade of brown). As such, in several embodiments, the computing system 106 may analyze the image received at (204) to classify each pixel therein as either a plant pixel or a non-plant pixel based on its color. However, in alternative embodiment, the computing system 106 may classify the pixels within the received image in any other suitable manner (e.g., based on image gradient or other textural differences between the plants and non-plant matter).

In addition, at (208), the control logic 200 includes identifying the stalks of the plants depicted within the received image based on the classified pixels. Specifically, in several embodiments, after classifying the pixels at (206), the computing system 106 may identify the various groups of pixels classified as plant pixels. Thereafter, the computing system 106 may analyze each identified group of plant pixels to identify the stalks the plants depicted in the received image. As used herein, the stalk of a plant refers to its main stem or main slender upright structural portion extending from its roots to its leaves. As will be described below, each identified stalk may then be analyzed to determine whether the corresponding plant is a crop or a weed.

At (208), in one embodiment, the computing system 106 may identify the stalks of the plants depicted within the received image based to the dimensions of the groups of plant pixels. In general, the stalk of a plant is long and slender (e.g., it has a high ratio of length to width), while the leaves of the plant do not. Thus, in such an embodiment, after classifying the pixels at (206), the computing system 106 may identify each contiguous group of pixels classified as plant pixels and determine the length and width of each group. For example, the length of a group of plant pixels may be the number of pixels across which the group extends in its longest direction. Conversely, the width of a group of plant pixels may be the number of pixels across which the group extends in the direction perpendicular to its longest direction. Thereafter, the computing system 106 may determine the ratio of the length and width of each group of pixels classified as plant pixels to a ratio range associated with plant stalks. All groups of plants pixels having a length to width ratio within the range may be identified as stalks, while all other groups plant pixels may correspond to leaves or other non-stalk portions of the plants.

FIG. 4 illustrates another embodiment of identifying the stalks of the plants depicted within the received image based on the pixels classified at (206). As will be described below, in the embodiment shown in FIG. 4, the computing system 106 may initially identify the bottom and top ends of each plant depicted within the received image. Thereafter, the computing system 106 may form a line extending from the top end of each plant to the bottom end of the corresponding plant. Each formed line may, in turn, correspond to the stalk of the corresponding plant.

The embodiment of identifying the stalks of the plants depicted within the received image illustrated in FIG. 4 will be described in the context of an example image 300 of the field shown in FIG. 5. More specifically, the image 300 depicts a contiguous group of pixels 302 classified as plant pixels (i.e., the cross-hatched region of FIG. 5) and a group of pixels classified as non-plant pixels (i.e., the non-crosshatched region of FIG. 5). In this respect, the image 300 includes an interface or border (indicated by line 304) defined between the plant pixels and the non-plant pixels, with the interface 304 generally forming the shape of a plant. Moreover, the group of plant pixels 302 includes a portion 306 corresponding to the stalk of the plant and portions 308, 310, 312, 314, 316 corresponding to various leaves of the plant. In addition, for the purposes of clarity, the image 300 depicts a single corn plant. However, in practice, the received images of the field (e.g., the images received at (204)) will generally depict a plurality of plants (e.g., a combination of crops and weeds).

As shown in FIG. 4, at (208A), the interfaces between contiguous groups of pixels classified as plant pixels and groups of pixels classified as non-plant pixels may be identified. For example, the computing system 106 may analyze the classified pixels of the received image (e.g., the image received at (204) and classified at (206)) to identify the interfaces (e.g., the interface 304 shown in FIG. 5) between the plant pixels and the non-plant pixels. The identified interfaces may, in turn, generally form the perimeters of the plants depicted within the received image.

In general, the portion of the stalk positioned at the bottom end of a plant defines closely positioned supplementary angles with the background soil in the received image. Specifically, these supplementary angles are formed by the intersection of the bottom of the stalk with the soil and the orientation of the imaging device(s) 102. As such, at (208B), first and second supplementary angles defined by a given interface of the identified interfaces may be identified. For example, the computing system 106 may analyze the interfaces identified at (208A) (e.g., the interface 304 in FIG. 5) to identify any pairs of supplementary angles defined by the interfaces (e.g., the angles indicated by arrows 318, 320 in FIG. 5). Moreover, at (208C), the distance between the vertices of the any pairs of identified supplementary angles may be determined. For example, the computing system 106 may determine the distances between the pairs of supplementary angles identified at (208B) (e.g., the angles 318, 320). Thereafter, at (208D), when the distance of a given portion of the interface extending between the first and second supplementary angles is within a predetermined range, the given portion of the interface may be identified as the bottom end of the plant. For example, the computing system 106 may identify the portions of the interfaces extending between pairs of supplementary angles identified at (208C) and having lengths within a predetermined range associated with expected stalk widths (e.g., the portion 322 of the interface 304 extending between the angles 318, 320 in FIG. 5) as the bottom ends of the plants.

Furthermore, for certain species of plants (e.g., corn), the leaves may extend upward and outward from the stalk such that a V-shape or acute angle is defined between each leaf and the stalk. In this respect, at (208E), one or more acute angles defined between portions of the given group of pixels classified as plant pixels may be identified. For example, the computing system 106 may identify any acute angles defined between the various portions of the groups of plant pixels 302 present within the received image (e.g., the acute angles 324, 326, 328, 330 defined between the various portions 306, 308, 310, 312, 314, 316 of the group of plant pixels 302 in FIG. 5). These identified acute angles may, in turn, be indicative of the positions where the leaves of attach to the stalk of a plant. Moreover, most plants have leaves positioned at the top end of its stalk. As such, for a given contiguous group of plant pixels, the acute angle positioned farthest from the corresponding interface portion identified as the bottom end may generally correspond to the top end of the plant. As such, at (208F), the vertex of the acute angle positioned farthest from the identified bottom end of the plant is identified as the top end of the plant. For example, the computing system 106 may, for each contiguous group of plant pixels, determine the acute angle identified at (208E) that is positioned farthest from the interface portion identified as the corresponding bottom end (e.g., the acute angle 326 in FIG. 5). Thereafter, the computing system 106 may identify such acute angles as the top ends of the plants.

Additionally, at (208G), a line extending between the top and bottom ends of each plant is formed. For example, the computing system 106 may form a line extending from the top end of each plant (e.g., the vertex 332 in FIG. 5) to the bottom end of the plant (e.g., the interface portion 322 in FIG. 5). The formed lines may, in turn, correspond to the stalks the plants depicted within the received image. In some embodiments, the formed line may extend directly from the vertex of the acute angle forming the top end of each plant to the interface portion forming the bottom end of the corresponding plant without regard for any other identified acute angles (i.e., the acute angles formed by the leaves attached to stalk between its top and bottom ends). Alternatively, in other embodiments, the formed line may connect the vertices of all of the identified acute angles of each plant to the interface portion forming the bottom end of the corresponding plant.

Figure 3:
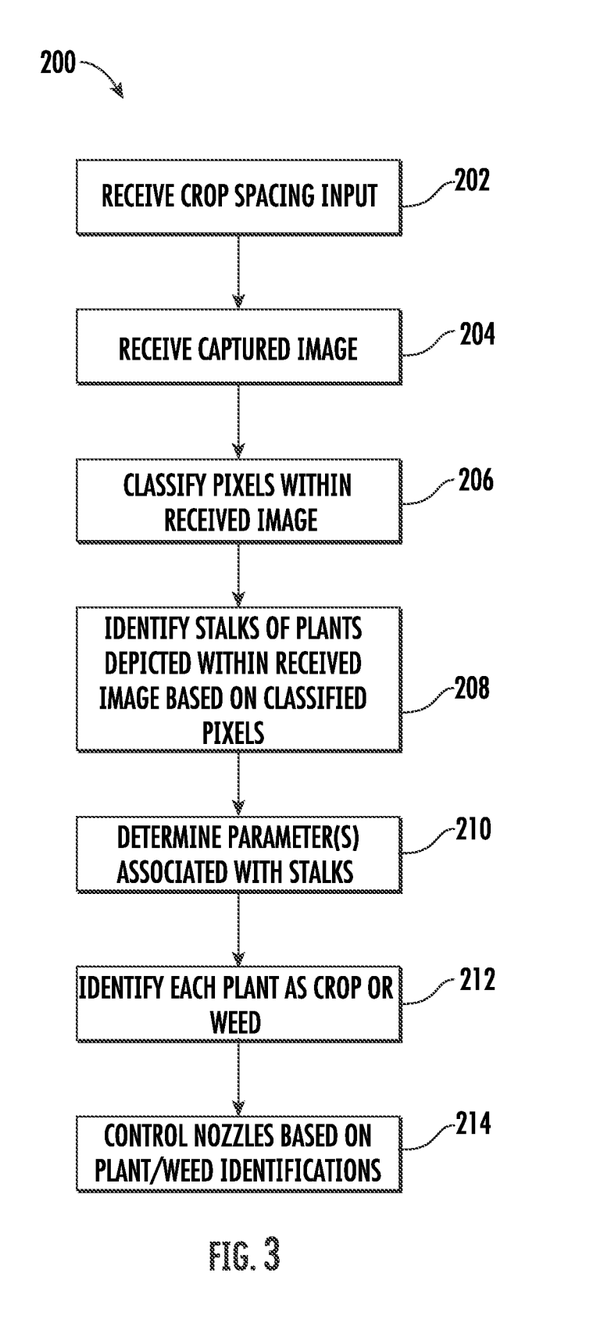
FIG. 3 illustrates a flow diagram providing one embodiment of example control logic for identifying weeds present within a field in accordance with aspects of the present subject matter.

As shown in FIG. 3, at (210), the control logic 200 includes determining one or more parameters associated with the identified stalks depicted within the received image. Specifically, in several embodiments, the computing system 106 may determine one or dimensional parameters of each stalk identified at (208) (e.g., the groups of pixels identified as stalks based on their ratio of length to width or the lines formed at (208G)). For example, such parameters may include the lengths of the stalks, the orientations of the stalks (e.g., relative to the ground), the distances between adjacent stalks (e.g., within the same crop row), and/or the like.

Furthermore, at (212), the control logic 200 includes identifying each plant depicted within the received image as either a crop or a weed based on the determined parameter(s). In general, the stalks of crops have different parameters than the stalks of weeds. For example, the stalks of crops are generally longer, straighter, and extend more perpendicular relative to the ground than the stalks of weeds. Moreover, crop stalks generally have more consistent lengths than weeds. As such, the computing system 106 may an identify each plant depicted within the received image as either a crop or a weed based on the corresponding parameter(s) determined at (210). For example, in some embodiments, the computing system 106 may identify each plant depicted within the received image as either a crop or a weed based on the length and orientation of its stalk determined at (210). As used herein, a crop is a plant, such as corn, that has been purposely planted within the field eventual harvesting and use. Conversely, a weed is an unwanted plant present within the field, such as ragweed or Bermuda grass.

Additionally, in some embodiments, at (212), the computing system 106 may identify each plant depicted within the received image as either a crop or a weed based on the crop spacing input in addition to the length and orientation of its stalk. In general, crop seeds are planted such that the crops are positioned a predetermined distance apart from each other within a crop row. Thus, plants that are consistently spaced apart from each other by the intra-row crop spacing are more likely to be crops than weeds. Thus, in some embodiments, the computing system 106 may, for a given stalk depicted within the received image, use the distance between the given stalk and the adjacent stalks in addition to its length and orientation to identify the plant associated with the given stalk as either a crop or plant.

Moreover, at (214), the control logic 200 includes controlling the operation of the nozzle(s) of the agricultural sprayer to selectively dispense the agricultural fluid based on the identification of each plant as either a crop or a weed. Specifically, in several embodiments, the computing system 106 may control the operation of the nozzle actuator(s) 104 such that the nozzle(s) 38 dispense the agricultural fluid stored within the tank 22 onto either only the plants identified as crops or only the plants identified as weeds. For example, when the agricultural fluid is a herbicide, the computing system 106 may control the operation of the nozzle actuator(s) 104 such that the nozzle(s) 38 dispenses the herbicide onto only the plants identified as weeds. Conversely, when the agricultural fluid is a fertilize or a nutrient, the computing system 106 may control the operation of the nozzle actuator(s) 104 such that the nozzle(s) 38 dispenses the fertilizer/nutrient onto only the plants identified as crops.

Figure 5:
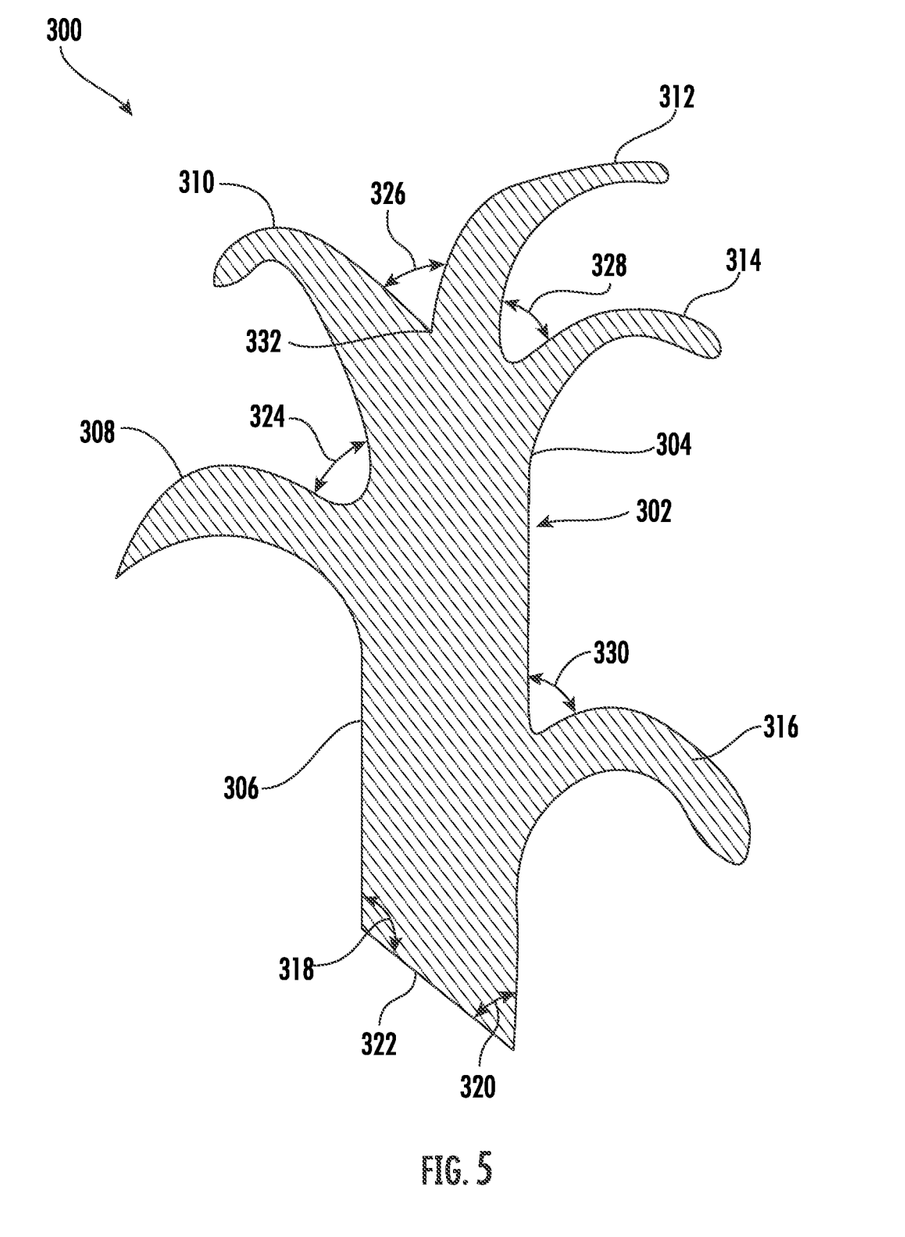
FIG. 5 illustrates an example image depicting a plant present within the field, particularly illustrating a group of pixels classified as plant pixels and a group of pixels classified as non-plant pixels.
Figure 6:
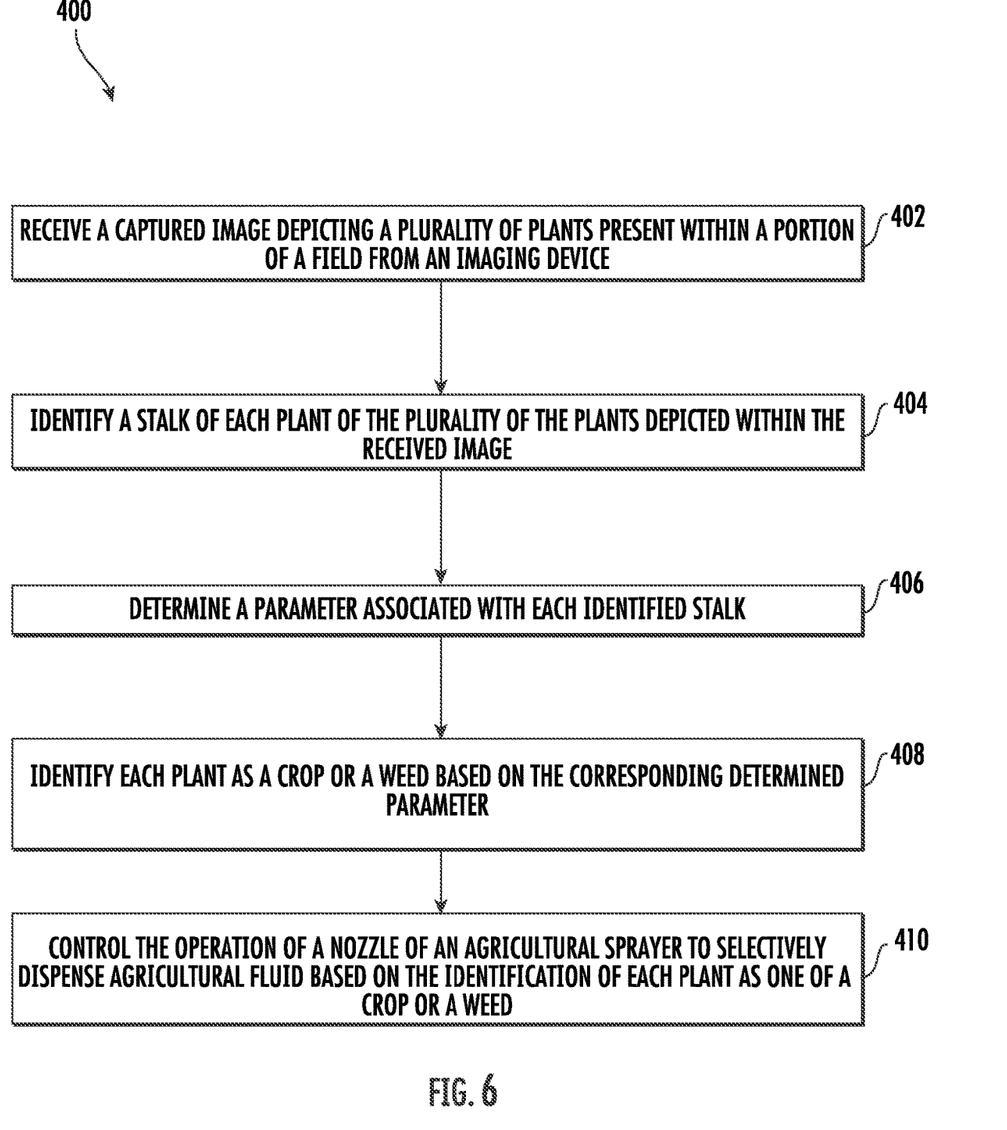
FIG. 6 illustrates a flow diagram of one embodiment of a method for identifying weeds present within a field in accordance with aspects of the present subject matter.

Referring now to FIG. 6, a flow diagram of one embodiment of a method 400 for identifying weeds present within a field is illustrated in accordance with aspects of the present subject matter. In general, the method 400 will be described herein with reference to the agricultural sprayer 10 and the system 100 described above with reference to FIGS. 1-5. However, it should be appreciated by those of ordinary skill in the art that the disclosed method 400 may generally be implemented with any agricultural sprayer having any suitable sprayer configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402), the method 400 may include receiving, with a computing system, an image depicting a plurality of plants present within a portion of a field from an imaging device. For instance, as described above, the computing system 106 may receive images depicting the plants present within a portion of a field from the imaging device(s) 102 as the agricultural sprayer 10 travels across the field to perform a spraying operation thereon.

Furthermore, at (404), the method 400 may include identifying, with the computing system, a stalk of each plant of the plurality of the plants depicted within the received image. For example, as described above, the computing system 106 may analyze the received images to identify the stalk of each plant depicted within the received images.

Additionally, as shown in FIG. 5, at (406), the method 400 may include determining, with the computing system, a parameter associated with each identified stalk. For instance, as described above, the computing system 106 may determine one or more parameters (e.g., length, orientation, relative spacing, etc.) associated with each identified stalk.

Moreover, at (408), the method 400 may include identifying, with the computing system, each plant of the plurality of plants as a crop or a weed based on the corresponding determined parameter. For instance, as described above, the computing system 106 may identify each plant as either a crop or a weed based on the corresponding determined parameter(s).

In addition, at (410), the method 400 may include controlling, with the computing system, the operation of a nozzle of an agricultural sprayer to selectively dispense agricultural fluid based on the identification of each plant as one of a crop or a weed. For instance, as described above, the computing system 106 may control the operation of the nozzles actuator(s) 104 such that the nozzles 38 of the sprayer 10 selectively dispense the agricultural fluid stored within the tank 22 onto either only the plants identified as weeds or only the plants identified as crops.

It is to be understood that the steps of the control logic 200 and the method 400 are performed by the computing system 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 106 described herein, such as the control logic 200 and the method 400, is implemented in software code or instructions which are tangibly stored on a tangible computer readable medium. The computing system 106 loads the software code or instructions via a direct interface with the computer readable medium or via a wired and/or wireless network. Upon loading and executing such software code or instructions by the computing system 106, the computing system 106 may perform any of the functionality of the computing system 106 described herein, including any steps of the control logic 200 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for identifying weeds present within a field, the system comprising: a nozzle configured to selectively dispense an agricultural fluid onto a plant present within the field; an imaging device configured to capture an image depicting a plurality of plants present within the field; and a computing system communicatively coupled to the imaging device, the computing system configured to:
receive the captured image from the imaging device; identify a stalk of each plant of the plurality of the plants depicted within the received image; determine a parameter associated with each identified stalk; receive an input indicative of an intra-row crop spacing of a crop; identify each plant of the plurality of plants as the crop or a weed based on the corresponding determined parameter and the received input; and control an operation of the nozzle to selectively dispense the agricultural fluid based on the identification of each plant as one of the crop or the weed, wherein, when identifying the stalk of each plant of the plurality of plants, the computing system is configured to:
classify each pixel of a plurality of pixels forming the received image as one of a plant pixel or a non-plant pixel based on a color of each pixel; identify each group of pixels classified as plant pixels and having a ratio of length and width within a predetermined range as the stalk of one of the plurality of plants;identify a bottom end of each plant;
identify a top end of each plant; form a line extending from the top end of each plant to the bottom end of the corresponding plant; and wherein, when identifying the bottom end of each plant, the computing system is configured to: identify interfaces between groups of pixels classified as plant pixels and groups of pixels classified as non-plant pixels; identify first and second supplementary angles defined by a given interface of the identified interfaces; and determine a distance between vertices of the identified first and second supplementary angles; and when the determined distance is within a predetermined range, identify a portion of the given interface extending between the first and second supplementary angles as the bottom end of one of the plurality of plants.

2. The system of claim 1, wherein the determined parameter comprises a length of the stalk.

3. The system of claim 1, wherein the determined parameter comprises an orientation of the stalk.

4. The system of claim 1, wherein, when identifying the top end of each plant, the computing system is, for a given group of pixels classified as plant pixels, configured to: identify one or more acute angles defined between portions of the given group of pixels classified as plant pixels; and identify a vertex of an acute angle of the identified one or more acute angles positioned farthest from the corresponding identified bottom end.

5. The system of claim 4, wherein, when forming the line, the computing system is configured to form the line such that the line connects the vertex of each of the one or more identified acute angles to the corresponding bottom end.

6. The system of claim 1, wherein, when determining the parameter associated with each identified stalk, the computing system is configured to determine at least one of a length or an orientation of each of the formed lines.

7. A method for identifying weeds present within a field, the method comprising: receiving, with a computing system, an image depicting a plurality of plants present within a portion of the field from an imaging device; identifying, with the computing system, a stalk of each plant of the plurality of the plants depicted within the received image; determining, with the computing system, a parameter associated with each identified stalk; receiving, with the computing system, an input indicative of an intra-row crop spacing of a crop; identifying, with the computing system, each plant of the plurality of plants as the crop or a weed based on the corresponding determined parameter and the received input; and controlling, with the computing system, an operation of a nozzle of an agricultural sprayer to selectively dispense agricultural fluid based on the identification of each plant as one of the crop or the weed wherein identifying the stalk of each plant of the plurality of plants comprises: classifying, with the computing system, each pixel of a plurality of pixels forming the received image as one of a plant pixel or a non-plant pixel based on a color of each pixel; identifying, with the computing system, each group of pixels classified as plant pixels and having a ratio of length and width within a predetermined range as the stalk of one of the plurality of plants; identifying, with the computing system, a bottom end of each plant; identifying, with the computing system, a top end of each plant; and forming, with the computing system, a line extending from the top end of each plant to the bottom end of the corresponding plant, wherein identifying the bottom end of each plant comprises:
identifying, with the computing system, interfaces between groups of pixels classified as plant pixels and groups of pixels classified as non-plant pixels; identifying, with the computing system, first and second supplementary angles defined by a given interface of the identified interfaces; and determining, with the computing system, a distance between vertices of the identified first and second supplementary angles; and when the determined distance is within a predetermined range, identifying, with the computing system, a portion of the given interface extending between the first and second supplementary angles as the bottom end of one of the plurality of plants.

8. The method of claim 7, wherein the determined parameter comprises a length of the stalk.

9. The method of claim 7, wherein the determined parameter comprises an orientation of the stalk.

10. The method of claim 7, wherein identifying the top end of each plant comprises for a given group of pixels classified as plant pixels: identifying, with the computing system, one or more acute angles defined between portions of the given group of pixels classified as plant pixels; and identifying, with the computing system, a vertex of an acute angle of the identified one or more acute angles positioned farthest from the correspond identified bottom end.

* * * * *